United States Patent [19]

Perron

[11] Patent Number: 5,170,918

[45] Date of Patent: Dec. 15, 1992

[54] ERGONOMIC CARRYING BELT FOR TREE PLANTING TRAYS

[76] Inventor: Christian Y. Perron, Route Rurale 1, Lac-des-Iles, Quebec, Canada, J0W 1J0

[21] Appl. No.: 757,584

[22] Filed: Sep. 11, 1991

[51] Int. Cl.⁵ ............................................. A45F 3/00
[52] U.S. Cl. .................................. 224/225; 224/226; 224/270
[58] Field of Search ............... 224/225, 226, 224, 270, 224/252, 253

[56] References Cited

U.S. PATENT DOCUMENTS 4,452,383 6/1984 Marttinen ............................ 224/258

Primary Examiner—Linda J. Sholl
Attorney, Agent, or Firm—Roland L. Morneau

[57] ABSTRACT

A device adapted to be worn around the waist of a tree planting person for ergonomically carrying a set of conventional planting trays. The trays having a plurality of recessed cells into which tree sprouts are grown. The carrying device has a main structural plate consisting of a relatively flat plate of rigid material bent integrally into a rear segment and two symmetrically disposed segments. A set of spacers consisting of a relatively flat plate of rigid material are suspended to the belt at one of their ends and rigidly attached to the main structural plate at their other end. A set of anchoring components consisting of a relatively flat piece of rigid material having a central relatively straight segment extending integrally at each end into an inwardly bent substantially arcuate segment are attached to the main structural plate. The belt is worn around the waist of the tree planting person with the main structural plate hanging from the belt by the spacers. The bent segments keep the straight segment of the anchoring component in a horizontally spaced relationship with the structural plate. Each one of the anchoring components is adapted to squeezingly receive one row of recessed cells from one of the conventional planting trays between the relatively straight segment and the main structural plate. The trays are thus releasably secured in a horizontal position on the carrying device.

9 Claims, 3 Drawing Sheets

ERGONOMIC CARRYING BELT FOR TREE PLANTING TRAYS

FIELD OF THE INVENTION

The present invention relates to the field of tree planting accessories and more specifically to a belt adapted to be worn around the waist of a tree planting person and to ergonomically carry conventional tree planting trays having recessed cells containing tree sprouts.

BACKGROUND OF THE INVENTION

Tree sprouts centrally produced in nurseries are used extensively in forest planting operations. Planting trays which consist of a set of recessed cells formed out of a sheet of polymeric material, are commonly used to shelter the tree sprouts during the early stages of growth. The cells are filled with a growing substratum into which the seed is planted. The seeds grow inside the cell until the sprout is ready to be planted in the ground.

In order to minimize the risk of damaging the fragile sprouts, they are transported to the planting sight in the trays and are only retracted from the cells on the field, during the actual planting operation.

The planting operation involves forming a recess in the ground, dropping the sprout into the recess and then covering the roots with soil. The planting operation, which often takes place on accidented terrain, requires the tree planting person to carry the trays to the planting location and perform a variety of movements such as bending and twisting his trunk, kneeling and squatting.

To further complicate the situation, the tree planting person is often paid according to the amount of sprouts planted and must thus perform these movements as quickly and efficiently as possible.

PRIOR ART

A search amongst prior patents has revealed a pertinent patent, mainly U.S. Pat. No. 4,452,383 granted to Toivo Marttinen in 1984.

Marttinen's patent discloses a carrying device for planting trays having a frame which can be fastened by means of a side arc to a belt supported by the waist of the planting person, and also supported by a harness consisting of belts attached to the upper body of the planting person.

The disclosed device is uncomfortable since the frame abuts on the hips of the tree planting person, and since even though the slant of the frame can be modified by adjusting the harness, the frame does not allow the tree planting person to move freely.

The weight of the planting trays has also been found to be unevenly distributed, thus limiting the amount of trays which can be carried and forcing the tree planting person to waste valuable time running between the actual planting site and a tree dispensing site.

Furthermore, the harness fastened around the upper body of the tree planting person is uncomfortable to female planters since some of the belts were pressing against their breasts.

SUMMARY OF THE INVENTION

Accordingly, the present invention relates to a carrying belt for conventional planting trays which is comfortable to wear and which is specifically adapted to allow the tree planting person to ergonomically perform the movements of the planting operation efficiently.

The device is adapted to laterally support tree trays in a substantially horizontal position, distributing the weight of the trays evenly on a cushioning component worn around the waist of the tree planting person and preventing the trays from coming into contact with the body of the tree planting person.

The carrying device has a belt adapted to be worn around the waist of the tree planting person and a main structural plate which comprises a relatively flat plate of rigid material bended integrally into a rear segment and two lateral symmetrically disposed segments to partly surround the person's body. The device also has a set of spacers, each one of the spacers consisting of a flat plate of rigid material suspended from the belt, at one of their ends and rigidly attached to the main structural plate at their other end.

A set of anchoring components are rigidly fixed to the main structural plate. Each one of the anchoring components consists of a relatively flat piece of rigid material having a central relatively straight segment which extends integrally at each end into an inwardly bended, and preferably arcuate segment.

The belt is worn around the waist of the tree planting person with the structural plate hanging from the belt by the spacers. The bended segment of the anchoring components keeps the straight segments in a spaced relationship with the structural plate. Each one of the anchoring components is thus adapted to squeezingly receive one row of recessed cells from one of the conventional planting trays between the relatively straight segment and the main structural plate. The trays are thus releasably secured in a substantially horizontal position on the carrying device.

The belt has a belt strap rigidly fixed to a cushioning component. The cushioning component is adapted to partly encircle the waist of the tree planting person and has a width adapted to cover a substantial portion of the lumbar region of the tree planting person.

The spacers comprise a pair of longer spacers having a substantially arcuate shape and attached to both front ends of the main structural plate and a set of shorter spacers located between the long ones. The shorter spacers have a substantially vertical segment adapted to abut against the cushioning component, a second integrally extending substantially angular segment which projects outwardly away of the body of the tree planting person, a third integrally extending downward segment, to which the main structural plate is attached. The spacers are adapted to keep the structural plate in a substantially horizontally spaced relationship with the tree planting person to prevent the structural plate and trays from coming into contact with the tree planting person.

The side segments project forwardly and outwardly from the rear segment. Both ends of the main structural plate thus project away from each other to further prevent the main structural plate from coming into contact with the tree planting person.

The side segments are preferably downwardly slanted to facilitate manipulation of the sprouts located in the cells adjacent the rear segments.

The arcuate segments of the anchoring components are correspondingly sized to fittingly encircle the contour of the cells of the trays to further stabilize the trays on the supporting structure.

DETAILED DESCRIPTION OF THE PREFERRED EMBODIMENT

Figure 1:
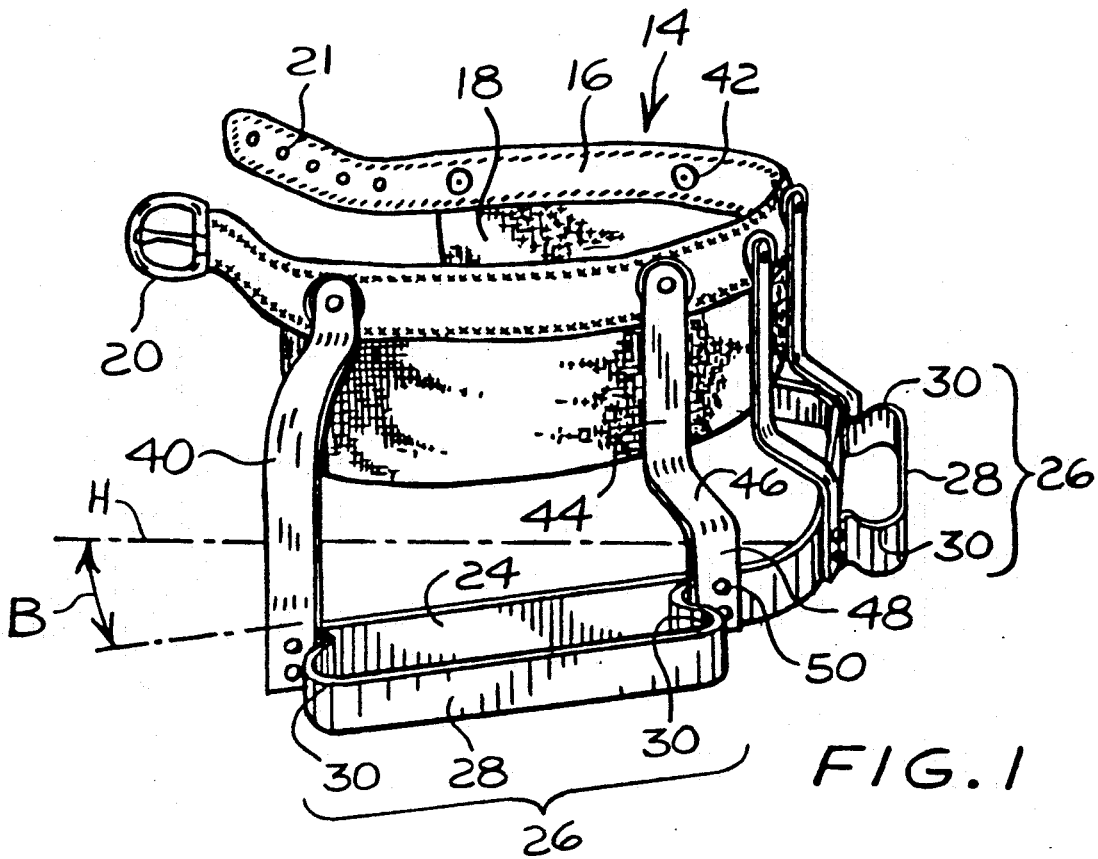
FIG. 1 is a side perspective view of the carrying device embodying the invention.
Figure 2:
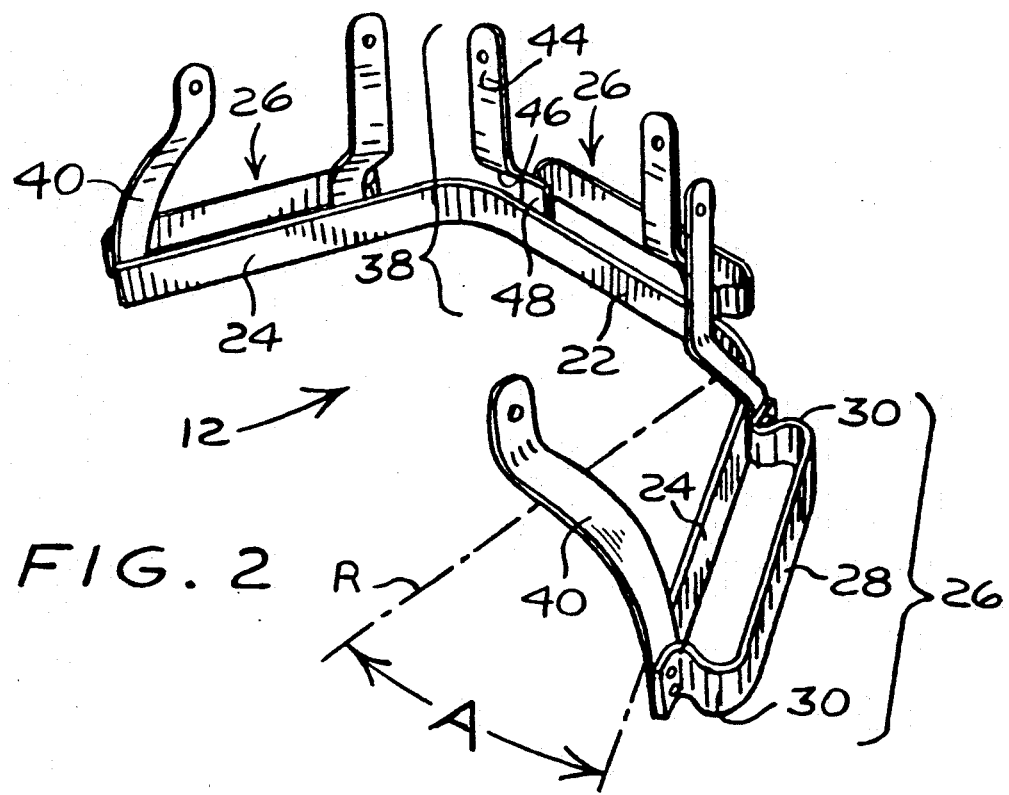
FIG. 2 is a front perspective view of the supporting frame of the device.
Figure 3:
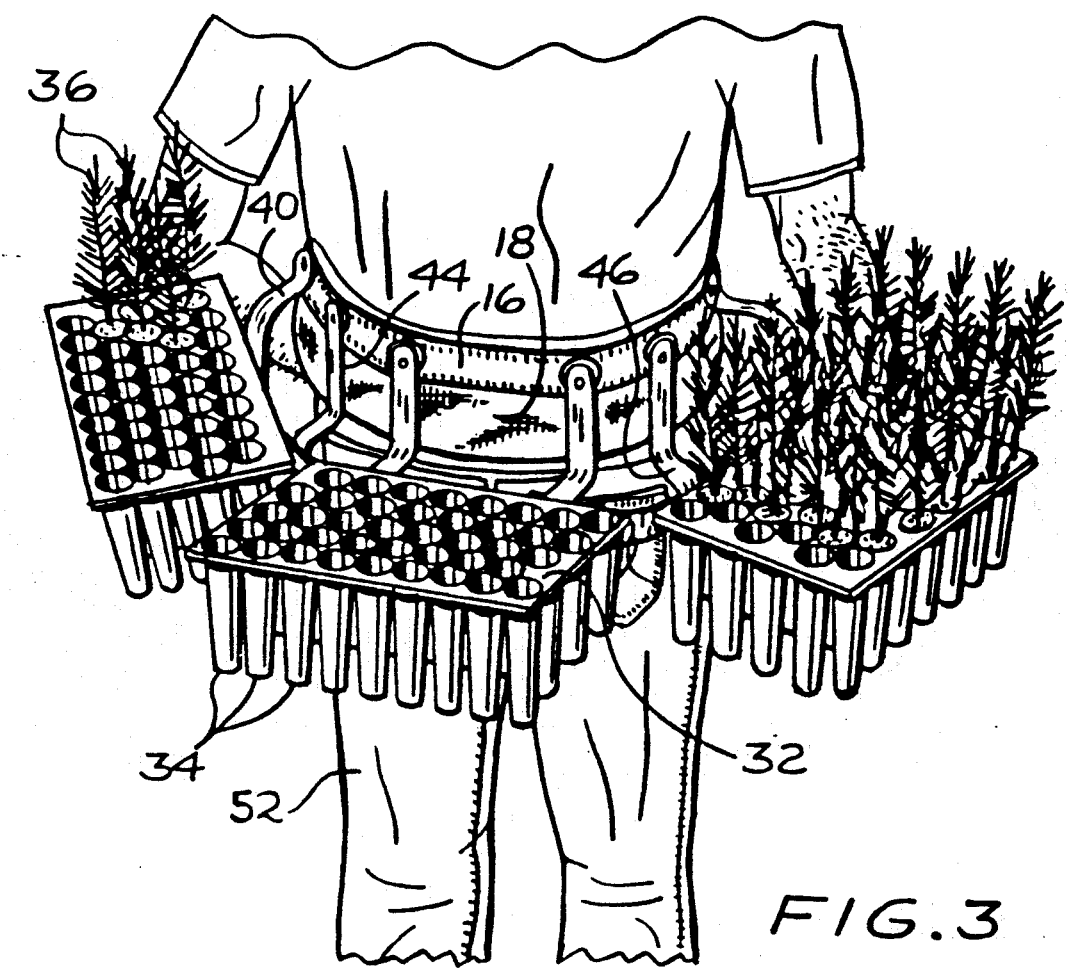
FIG. 3 is a schematic back view of a tree planting person wearing the belt which carries three planting trays.
Figure 4:
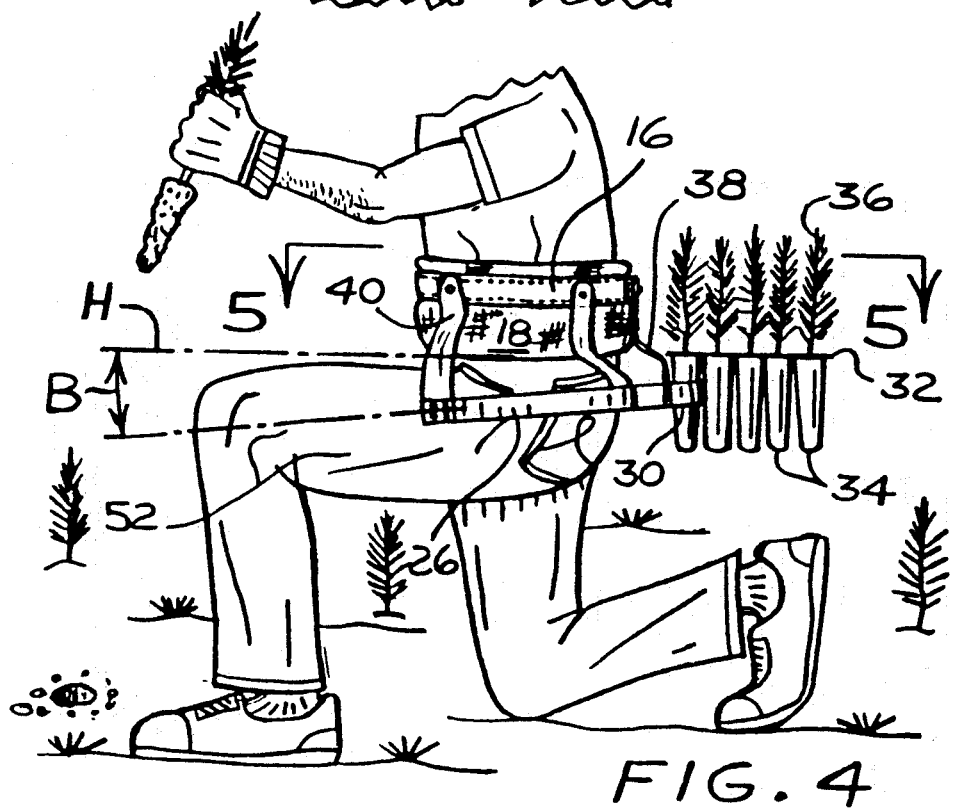
FIG. 4 is a schematic view of a tree planting person wearing the belt and squatting while about to plant a sprout.
Figure 5:
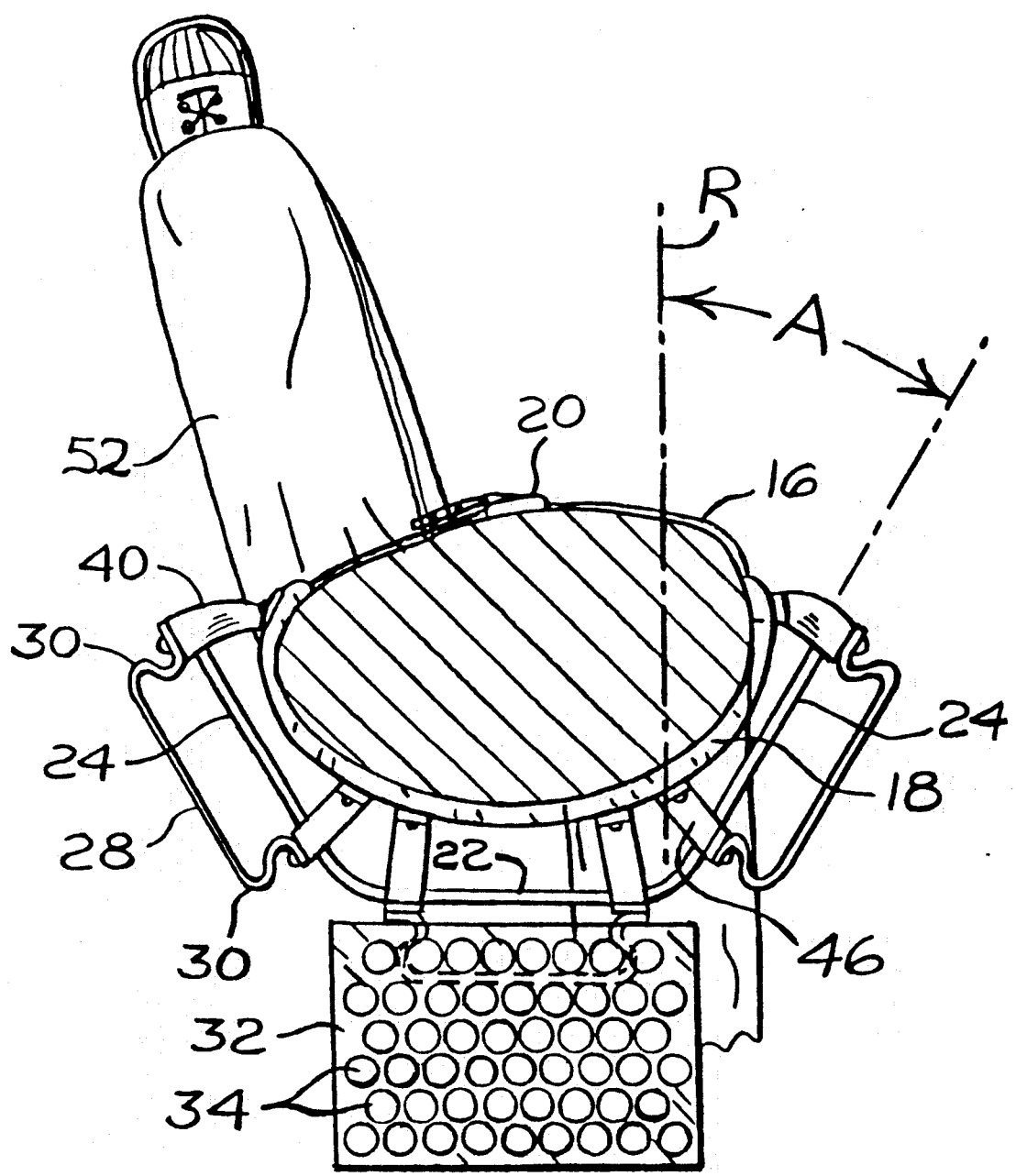
FIG. 5 is a cross-sectional view taken along arrows 5—5 of FIG. 4, illustrating the spaced relationship between the carrying device and the tree planting person.

Referring to the drawings, there is shown a carrying device for planting trays having a supporting frame 12 illustrated more specifically in FIG. 2 and mounted on an adjustable waist belt 14 illustrated in FIG. 1. The adjustable waist belt 14 has a flexible belt strap 16 rigidly fixed to the top portion of a cushioning component 18. The cushioning component 18 is made of a foam covered with a non-allergic coating material. As illustrated in FIGS. 3, 4 and 5, the cushioning component 18 has a width adapted to encircle a substantial portion of the lumbar region of the tree planting person. The belt strap 16 is provided with a size adjustment means such as a buckle 20 and its associated buckle apertures 21 which allow the belt 14 to be adjusted to variable waist sizes.

As illustrated more specifically in FIG. 2, the supporting frame 12 has a main structural plate consisting of a relatively flat plate of rigid material bended integrally into a rear segment 22 and two symetrically disposed side segments 24.

An anchoring component 26 is rigidly fixed to each one of the side segments 24 and to the rear segment 22. Each one of the anchoring components 26 is made of a relatively flat plate of rigid material having a substantially straight segment 28 parallel with segments 22 and a substantially arcuate inwardly bended segment 30 extending integrally at both ends of the relatively straight segment 28. The relatively straight segment 28 is kept in horizontal and parallel spaced relationship with the segments 22 and 24 by the substantially arcuate segments 30.

As illustrated in FIGS. 3, 4 and 5, the planting trays, which are already used extensively in the tree planting industry, are made of a sheet of plastic 32 linking five rows of eight adjacent recesses which define a set of tapered cells 34 into which the plants are nurtured.

In use, the trays are removably mounted on the supporting frame 12 by squeezingly inserting a peripheral row of cells 34 between the segments 22 or 24 of the main structural plate and the straight segment 28 of the anchoring component 26. The trays are thus mounted in a relatively horizontal position adjacent the body of the tree planting person without touching it. The arcuate segment 30 is adapted to fittingly encircle the contour of a cell to further stabilize the tray on the supporting frame 12.

Since the trays are squeezing inserted on the frame 12, they can easily and readily be mounted and dismounted from the frame without wasting any valuable time. Furthermore, the structure is adapted to similtaneously support three trays. Therefore, when one of the trays mounted on the side segments 24, is empty, it can be readily interchanged with a tray mounted on the rear segment 22 thus again saving valuable time to the tree planting person.

The supporting frame 12 is rigidly mounted on the waist belt 14 by a set of four lateral and rear smaller spacers 38 and two front longer spacers 40. The spacers 38 and 40 are fixed to the belt 14 by fixing means such as rivets 42.

Each one of the smaller spacers 38 comprise a relatively flat piece of rigid material bended integrally into a first vertical segment 44, a second angularly disposed segment 46 extending away from the belt 14 and a third downward segment 48 rigidly fixed to the supporting frame 12 by fixing means such as rivets 50.

The longer spacers 40 which are fixed to both front ends of the supporting frame 12 have an outwardly arcuate shape, as illustrated more specifically in FIG. 2.

One of the main features of the present invention resides in its ergonomic design which provides both comfort and freedom of movement, for the tree planting person. The weight of the carrying device and of the trays 32 which it carries are evenly distributed on the belt by the spacers 38 and 40. The first vertical segment 44 of the spacers 38 abuts against the cushioning component 18 of the waist belt 14. They are adapted to distribute the weight over the lumbar region of the tree planting person and to keep the cushioning component in full contact with the body of the tree planting person preventing the cushioning component 18 from warping.

The angularly disposed lateral segments 24 which extend away from the belt 14 prevent the supporting frame 12 from coming into contact with the body of the tree planting person, even if the tree planting person is performing bending, squatting, kneeling or twisting movements, as shown in FIGS. 4 and 5.

The longer spacers 40 which are fixed to both ends of the supporting frame 12 are specifically adapted to allow the leg of the tree planting person to move freely. The arcuate shape allows the spacer 40 to clear the leg of the tree planting person even when the tree planting person is squatting with one of his knees touching the ground, as illustrated in FIG. 4.

As illustrated more specifically in FIG. 2, the main structural plate of the supporting structure 12 when seen from the top has an outwardly tapering U-shape. The side segments 24 project outwardly at an angle A from a reference line "R" perpendicular to the rear segment 22. The angle A, which is about 20 degrees to 35 degrees, allows the leg of the tree planting person to pivot outwardly about the hip without coming into contact with the side segments 24.

As illustrated in FIGS. 1 and 4, the side segments 24 are preferably slanted downwardly at an angle "B" relative to a horizontal reference plane H. The angle "B" varies from 0 degrees to about 5 degrees. The downward slant of the segments 24 facilitate access to the sprouts located in the rearward cells of the trays mounted on the side segments 24 and to clear the thigh 52 as shown in FIGS. 4 and 5.

In the preferred embodiment, the spacers 38 and 40, the anchoring component 26, the rear segment 22 and the back segment 24 of the supporting frame 12 are all formed of relatively flat strips of light, yet rigid aluminum alloy.

I claim:

1. A device adapted to be worn around the waist of a tree planting person for ergonomically carrying a set of conventional planting trays, said planting trays having a plurality of adjacent rows of recessed cells into which tree sprouts are grown, said carrying device comprising:
- a belt adapted to be worn around said waist of said tree planting person,
- a main structural plate comprising of a relatively flat plate of rigid material bended integrally into a rear segment, and two symmetrically disposed side segments,
- a set of spacers, each one of said spacers consisting of a relatively flat plate of rigid material suspended to said belt at one of their ends and rigidly attached to said main structural plate at their other end,
- a set of anchoring components, each one of said anchoring components comprising a relatively flat piece of rigid material having a central relatively straight segment extending integrally at each end into an inwardly bent segment, said bent segments at each end of said relatively straight segment being attached to said main structural plate,
- whereby said belt is worn around said waist of said tree planting person, said main structural plate is hung from said belt by said spacers, said bent segments keeping said straight segment of said anchoring components in a spaced and parallel relationship with said structural plate and each one of said anchoring components is adapted to squeezingly receive one of said rows of said recessed cells from one of said conventional planting trays between said relatively straight segment and said main structural plate for releasably securing in a substantially horizontal position, said conventional planting trays to said carrying device.

2. A carrying device as recited in claim 1, wherein said belt comprises a cushioning component and belt strap rigidly fixed to said cushioning component, whereby said cushioning component is adapted to encircle the waist of said tree planting person and said cushioning component has a width adapted to cover a substantial portion of the lumbar region of said tree planting person.

3. A carrying device as recited in claim 2, wherein said set of spacers comprise a pair of front spacers having a substantially arcuate shape and attached to both ends of said main structural plate, and a set of lateral and rear spacers, said lateral and rear spacers having a first substantially vertical segment adapted to abut against said cushioning component, a second integrally extending substantially angular segment projecting outwardly away from the body of said tree planting person, a third integrally extending substantially vertical segment to which said main structural plate is attached, whereby said set of spacers is adapted to support and keep said structural plate in a substantially horizontally spaced relationship with said tree planting person to prevent said structural plate and said trays from coming into contact with said tree planting person.

4. A carrying device as recited in claim 2, wherein said side segments project forwardly and outwardly from said rear segment, whereby both ends of said main structural plate projects away from each other thus further preventing said main structural plate from coming into contact with said tree planting person.

5. A carrying device as recited in claim 2, wherein said side segments are downwardly slanted to facilitate manipulation of the sprouts located in said cells adjacent said rear segment.

6. A carrying device as recited in claim 2, wherein said bent segments of said anchoring components are arcuate to fittingly encircle the contour of said cells of said tray to further stabilize said trays on said supporting structure.

7. A carrying device as recited in claim 2, wherein said longer spacers, said shorter spacers, said anchoring components, said rear segment, said side segments are all formed of rigid, light aluminum alloy.

8. A carrying device as recited in claim 4, wherein said side segments project outwardly from said rear segment at an angle varying approximately between 20 degrees and 30 degrees with regards to a plane perpendicular to said rear segment.

9. A carrying device as recited in claim 5, wherein said side segments are downwardly slanted to an angle varying approximately between 0 degrees and 5 degrees with regards to a horizontal plane.

* * * * *